(12) United States Patent  
Ferrero et al.

(10) Patent No.: US 8,977,235 B2  
(45) Date of Patent: Mar. 10, 2015

(54) ESTABLISHMENT OF SECURE COMMUNICATION

(75) Inventors: Daniel Ferrero, Colombes (FR); Yann Pitiot, Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 498 days.

(21) Appl. No.: 13/394,229

(22) PCT Filed: Aug. 30, 2010

(86) PCT No.: PCT/FR2010/051796
§ 371 (c)(1),
(2), (4) Date: Mar. 5, 2012

(87) PCT Pub. No.: WO2011/030038
PCT Pub. Date: Mar. 17, 2011

(65) Prior Publication Data
US 2012/0164983 A1    Jun. 28, 2012

(30) Foreign Application Priority Data

Sep. 9, 2009    (FR) ...................................... 09 56132

(51) Int. Cl.
*H04W 12/04*    (2009.01)
*H04L 9/08*    (2006.01)
*H04L 9/12*    (2006.01)
*H04L 9/32*    (2006.01)

(52) U.S. Cl.
CPC ................ *H04L 9/0872* (2013.01); *H04L 9/12* (2013.01); *H04L 9/3228* (2013.01)
USPC ...................... 455/411; 455/414.1; 455/412.1; 455/407; 455/456.1; 455/279; 713/158; 713/155; 713/156; 713/171; 713/182

(58) Field of Classification Search
CPC ....................................................... H04W 12/04
USPC ........... 455/411–413, 557, 411–414.1, 456.1, 455/279, 407; 713/155–158, 171, 182
See application file for complete search history.

(56) References Cited

U.S. PATENT DOCUMENTS 7,184,573 B2 *   2/2007   Malone et al. ................. 382/100
8,625,793 B2 *   1/2014   Hawkes et al. ............... 380/247
(Continued)

OTHER PUBLICATIONS

Peter H Yu et al; d-key Dynamic Encryption—A Security Enhancement Protocol for Mobile Ad Hoc Network; Ubiquitous and Future Networks; 2009; ICUFN 2009; First International Conference on, IEEE, Piscataway, NJ, USA; Jun. 7, 2009; pp. 183-188; XP031497079; ISBN: 978-1-4244-4215-7.

(Continued)

*Primary Examiner* — Michael T Vu
(74) *Attorney, Agent, or Firm* — Carmen Patti Law Group, LLC

(57) ABSTRACT

An exemplary method and apparatus are provided for establishing a communication between a first communication terminal and a second communication terminal over a network. A server dynamically generates a first single-use key and a second single-use key respectively associated with the first and second communication terminals as a function of time data related to at least one previous communication between the first communication terminal and the second communication terminal, during a request to establish a call from the first communication terminal to the second communication terminal. The server compares the first and second keys that were generated, and authorizes the establishment of the communication if the compared keys are identical.

13 Claims, 3 Drawing Sheets

(56) References Cited

U.S. PATENT DOCUMENTS

2004/0179682 A1    9/2004  Soliman
2005/0283444 A1*   12/2005 Ekberg .......................... 705/67

OTHER PUBLICATIONS

Menezes, Vanstone, Oorschot; Handbook of Applied Cryptography; 1997; CRC Press LLC; USA; pp. 490-495; XP002587618.

* cited by examiner

ESTABLISHMENT OF SECURE COMMUNICATION

TECHNICAL FIELD

The present invention relates to establishing secure calls.

BACKGROUND

Currently, there are solutions for making communications between communication terminals secure, particularly involving servers and algorithms that use certificates to establish communications. These solutions are complex and require a costly client-server architecture as well as bandwidth.

One goal of the invention is to remedy the aforementioned drawbacks by making a communication between two communication terminals secure in a simple and efficient manner.

SUMMARY

In order to achieve this objective, a method for establishing a communication between a first communication terminal and a second communication terminal over a telecommunications network is characterized in that it comprises the following steps:

during a request to establish a call from the first communication terminal to the second communication terminal, dynamically generate a first single-use key and a second single-use key respectively associated with the first and second communication terminals as a function of time data related to at least one previous communication between the first communication terminal and the second communication terminal, compare the generated first and second keys, and allow the establishment of the communication if the compared keys are identical.

Advantageously, the invention provides a simple way to make a communication secure, while using a network architecture that is not very complex and expensive. The dynamic generation of single-use keys requires few exchanges of messages, and offers reliable communication security between the first and second mutation terminals.

The invention also pertains to a communication terminal for establishing a communication between the communication terminal and another communication terminal over a telecommunications network, characterized in that it comprises:

means for dynamically generating a first single-use key associated with the communication terminal as a function of time data related to at least one previous communication between the communication terminal and said other communication terminal, during a request to establish a call from the communication terminal to said other communication terminal, and means for transmitting the generated key to said other communication terminal, which is capable of dynamically generating a second single-use key associated with said other communication terminal as a function of time data related to said at least one previous communication between the communication terminal and said other communication terminal, of comparing the generated first and second keys, and of authorizing the establishment of the communication if the compared keys are identical.

The invention also pertains to a communication terminal for establishing a communication between the communication terminal and another communication terminal over a telecommunications network, characterized in that it comprises means for receiving a single-use first key associated with said other communication terminal dynamically generated by said other communication terminal as a function of time and data related to at least one previous communication between the communication terminal and said other communication terminal during a request to establish a call from said other communication terminal to the communication terminal, means for dynamically generating a second key as a function of time data related to said at least one previous communication between the communication terminal and said other communication terminal, means for comparing the generated first and second keys, means for authorizing the establishment of the communication if the compared keys are identical.

The invention also relates to a server for establishing a communication between a first communication terminal and a second communication terminal over a telecommunications network, characterized in that it comprises:

means for dynamically generating a first single-use key and a second single-use key respectively associated with the first and second communication terminals as a function of time data related to at least one previous communication between the first communication terminal and the second communication terminal, during a request to establish a call from the first communication terminal to the second communication terminal, means for comparing the generated first and second keys, and means for authorizing the establishment of the communication if the compared keys are identical.

The invention also pertains to a computer program capable of being implemented within a server, said program comprising instructions which, whenever the program is executed within said server, carry out the steps according to the inventive method.

DESCRIPTION OF THE DRAWINGS

The present invention and the benefits thereof shall be better understood upon examining the description below, which makes reference to the attached figures, in which.

DETAILED DESCRIPTION

Figure 1:
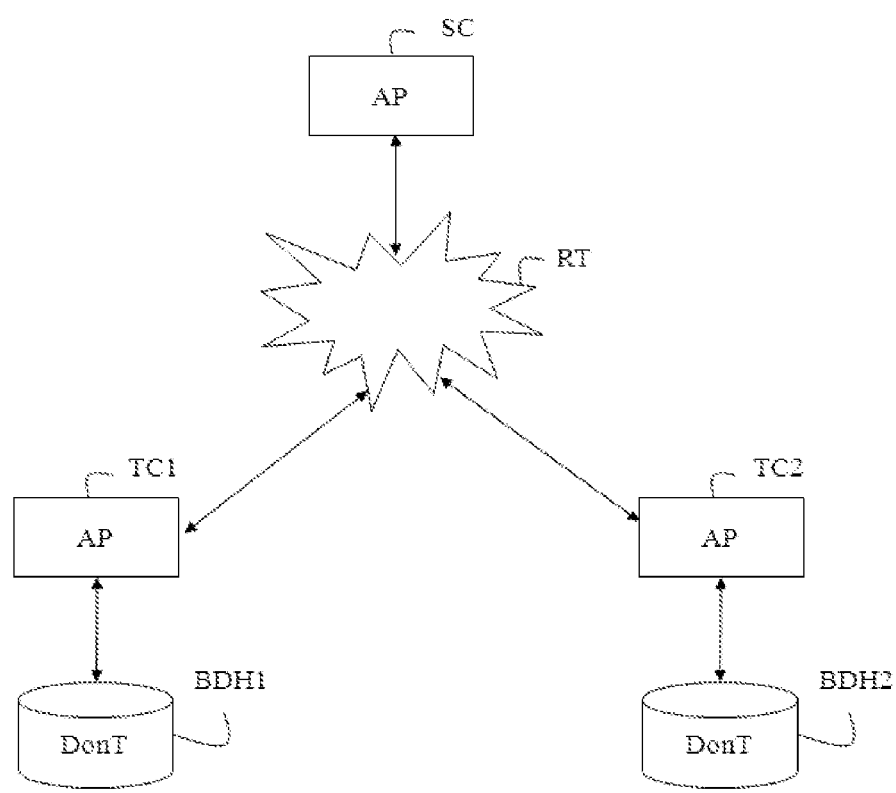
FIG. 1 is a schematic block diagram of a communication system according to one embodiment of the invention.

With reference to FIG. 1, a communication system comprises at least one first communication terminal TC1, a second communication terminal TC2 and at least one communication server SC, capable of communicating with one another over a telecommunications network RT.

The telecommunications network RT may be a wired or wireless network, or a combination of wired and wireless networks.

In one example, the telecommunications network RT is a high-speed IP ("Internet Protocol") packet network, such as the Internet or an intranet.

In another example, the telecommunications network RT is a TDM ("Time Division Multiplexing") network or a private network specific to a company supporting a proprietary protocol.

The communication terminals TC1 and TC2 are connected to the communication server SC over the telecommunications network RT.

For example, the communication terminal TC1 or RC2 is a TDM landline telephone or a voice-over-IP landline telephone.

According to another example, the communication terminals TC1 and TC2 are located at different sites and are respectively connected to different communication servers.

For example, the communication server SC is a PABX switch ("Private Automatic Branch eXchange"). The communication server SC comprises means, such as a software program or a combination of computing hardware and software, configured particularly to command a call routing.

It is assumed that the communication terminals connected to the communication server SC are synchronized with one another, for example by means of the communication server or an NTP ("Network Time Protocol") server.

Each communication terminal TC1, TC2 is associated with a known identifier IdT1, IdT2 of the communication server and of other communication terminals within the telecommunications network RT.

Each communication terminal is additionally associated with a log database, which may be included within the communication terminal or connected to it, or connected to the communication server SC. In this way, the first and second communication terminals TC1 and TC2 are respectively associated with first and second databases BDH1 and BDH2, which are, for example, respectively connected to or included within the terminals TC1 and TC2 as depicted in FIG. 1. In the event that the log database is external and connected to the communication terminal, the database is, for example, implemented within an electronic device, such as a USB key.

The log database associated with the communication terminal particularly saves information related to communications established with the communication terminal. More particularly, the information contains time databases DonT associated with each communication established between the communication terminal and another communication terminal, such as the date and duration of the communication.

The date and duration of the communication may have different degrees of precision.

For example, the precision of the date may be "Year, Month, Day, Hour" or with greater precision "Year, Month, Day, Hour, Minute, Second". The date may also contain an indication of the time zone.

Furthermore, the time data may be in different formats, for example binary or hexadecimal, in a given order.

The precision and format of the time data are for example defined by a system administrator who manages the communication server.

For example, it is assumed that a communication between the first communication terminal TC1 located in France and the second communication terminal TC2 located in China was established on Jun. 30, 2009 at 10:51 AM in France and lasted 5 minutes and 32 seconds.

The first log database BDH1 contains time data DonT for example, in the following format:
"IdT1-IdT2
Date: 30/06/2009
Time: 10:51 AM
Time zone: GMT+1
Duration: 5 nm 32 s"

The second log database BDH2 contains time data DonT for example, in the following format:
"IdT2-IdT1
Date: 30/06/2009
Time: 17:51 AM
Time zone: GMT+8
Duration: 5 nm 32 s"

According to one embodiment of the invention, an application AP is implemented in at least one of the communication terminals TC1 and TC2 and/or in the communication server SC, said application being dedicated to at least one of the communication terminals TC1 and TC2.

For example, an application is implemented only within the communication server SC, or is implemented within each of the communication terminals TC1 and TC2, or is implemented within one of the communication terminals TC1 and TC2 and within the communication server SC. By way of example, the application AP is depicted in FIG. 1 within each of the communication terminals TC1 and TC2 and within the communication server SC.

It is assumed that an application dedicated to a communication terminal TC1 or TC2 is implemented within the same device in which the log database associated with the communication terminal is implemented. For example, an application and a log database are implemented within each communication terminal, or within a device connected to the communication terminal, or within the communication server, or in both the communication server and in one of the communication terminals TC1 and TC2. In the latter case, an application and the first database BDH1 may be implemented in the first communication terminal TC1 and another application and the second database BDH2 may be implemented in the communication server SC.

It is a feature of the application to generate a single-use key associated with the communication terminal as a function of time data DonT related to at least one communication established with the communication terminal. The key is dynamically and uniquely generated when a communication is established with the communication terminal. The application is, for example, implemented in the form of a computer program.

Figure 2:
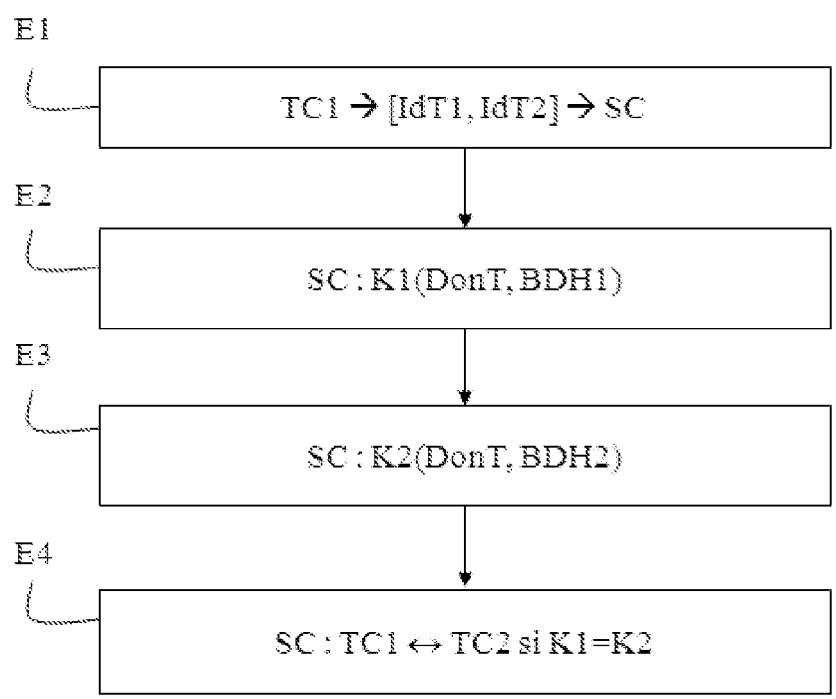
FIG. 2 is an algorithm of a method for establishing secure communication according to a first embodiment of the invention.

With reference to FIG. 2, a method for establishing a communication in a secure manner according to a first embodiment of the invention comprises steps E1 to E4 executed within the communication system.

Initially, it is assumed that multiple communications had already been previously established between the communication terminals TC1 and TC2, the communications being telephone calls.

For each communication established between the communication terminals TC1 and TC2, it is assumed that an application dedicated to at least one of the communication terminals TC1 and TC2 is implemented within the communication server SC, and saves time data DonT associated with the communication in log databases, containing in particular the date and duration of the call.

In step E1, the user of the first communication terminal TC1 wishes to call the user of the second communication terminal TC2 and triggers a procedure to request the establishment of a call.

The first communication terminal TC1 transmits a message to the communication server SC, the message containing at least the identifiers IdT1 and IdT2 of the communication terminals TC1 and TC2 in order to establish a communication with the second communication terminal TC2.

In step E2, the application within the communication server SC determines time data DonT related to at least one of the previous communications between the communication terminals TC1 and TC2 within the first database BDH1, using the identifiers IdT1 and IdT2, and generates a first single-use authentication key K1 as a function of the determined time data DonT.

By way of example, the time data DonT relate to a given communication that had previously been established between the communication terminals TC1 and TC2, said given communication potentially having been the last communication established. According to another example, the time data relates to a combination of multiple given communications that had previously been established between the communication terminals TC1 and TC2.

Furthermore, the time data that relates to a communication particularly contains the date and duration of the communication, and optionally an indication of the time zone associated with the first communication terminal TC1. Furthermore, the precision of the date may be of different degrees, such as "Year, Month, Day, Hour" or might be "Year, Month, Day, Hour, Minute, Second".

The first authentication key K1 is thereby associated with a set of communications previously established between the terminals TC1 and TC2, said set potentially being restricted to a single communication.

In step E3, the application within the communication server SC determines time data DonT related to the same set of communications previously established between the communication terminals TC1 and TC2 in the second database BDH2 and dynamically generates a second single-use authentication key K2 as a function of the determined time data DonT.

In step E4, the application compares the keys K1 and K2, and the application authorizes the establishment of the communication between the communication terminals TC1 and TC2, if the compared keys K1 and K2 are identical.

If the keys K1 and K2 are not identical, the application refuses to establish the communication between the communication terminals TC1 and TC2.

Figure 3:
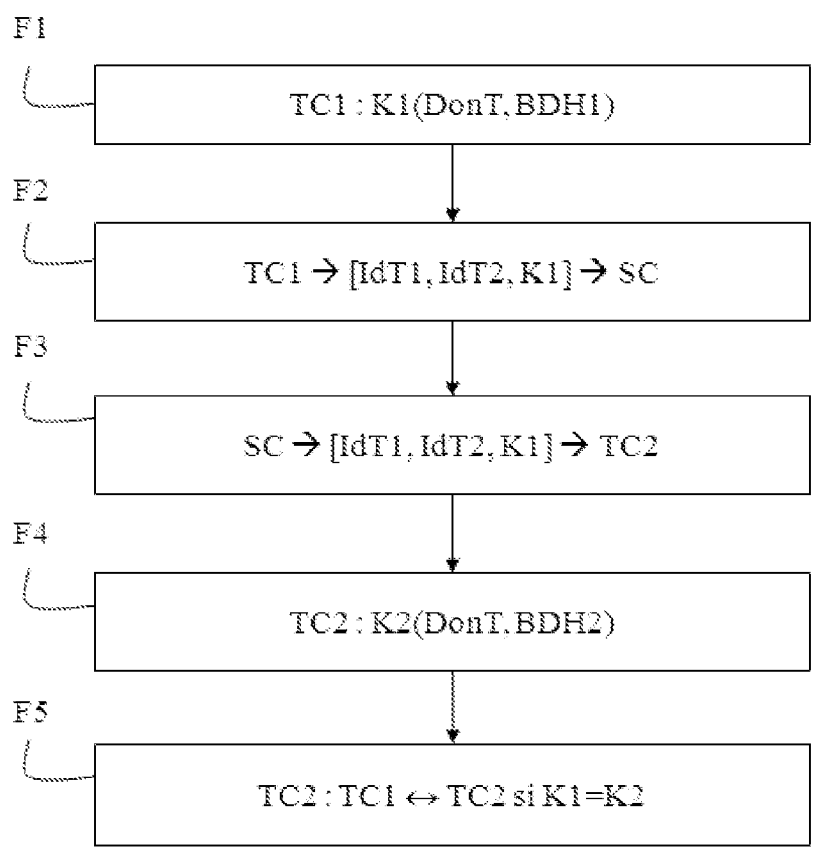
FIG. 3 is an algorithm of a method for establishing secure communication according to a second embodiment of the invention.

With reference to FIG. 3, a method for establishing a communication in a secure manner according to a second embodiment of the invention comprises steps F1 to F7 executed within the communication system.

Initially, it is assumed that multiple communications had already been previously established between the communication terminals TC1 and TC2, the communications being telephone calls.

For each communication established between the communication terminals TC1 and TC2, it is assumed that an application and a log database are implemented within each communication terminal TC1 and TC2 and saves time data DonT associated with the communication in the database, particularly containing the date and the duration of the communication.

In step F1, the user of the first communication terminal TC1 wishes to call the user of the second communication terminal TC2 and triggers a procedure to request the establishment of a call.

The application within the communication server SC determines time data DonT related to at least one of the preceding communications between the communication terminals TC1 and TC2 within the database BDH1, using the identifiers IdT1 and IdT2 and dynamically generates a first single-use authentication key K1 as a function of the determined time data DonT.

By way of example, the time data DonT relate to a given communication that had previously been established between the communication terminals TC1 and TC2, said given communication potentially having been the last communication established. According to another example, the time data relates to a combination of multiple given communications that had previously been established between the communication terminals TC1 and TC2.

Furthermore, the time data that relates to a communication particularly contains the date and duration of the communication, and optionally an indication of the time zone associated with the first communication terminal TC1. Furthermore, the precision of the date may be of different degrees, such as "Year, Month, Day, Hour" or might be "Year, Month, Day, Hour, Minute, Second".

The first authentication key K1 is thereby associated with a set of communications previously established between the terminals TC1 and TC2, said set potentially being restricted to a single communication.

In step F2, the first communication terminal TC1 transmits a message to the communication server SC, the message containing at least the identifiers IdT1 and IdT2 of the communication terminals TC1 and TC2 and the first authentication key K1 in order to establish a communication with the second communication terminal TC2.

In step F3, the server retransmits the message containing the identifiers IdT1 and IdT2 and the key K1 to the second communication terminal TC2.

In step F4, the application within the second communication server TC2 determines time data DonT related to the same set of communications previously established between the communication terminals TC1 and TC2 in the second database BDH2 and dynamically generates a second single-use authentication key K2 as a function of the determined time data DonT.

In step F5, the application within the second communication server TC2 compares the keys K1 and K2, and the application authorizes the establishment of the communication between the communication terminals TC1 and TC2, if the compared keys K1 and K2 are identical.

If the keys K1 and K2 are not identical, the application refuses to establish the communication between the communication terminals TC1 and TC2.

Optionally, a system administrator defines an initial key for each user beforehand, which can be used for a first communication between two users.

Optionally, the messages that include keys are encrypted.

The invention described here relates to a method and a server for establishing a communication between a first communication terminal and a second communication terminal. According to one embodiment of the invention, the steps of the inventive method are determined by the instructions of a computer program incorporated into a server, such as the communication server SC. The program comprises program instructions, which when said program is loaded and executed within the server, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for establishing a communication between a first communication terminal and a second communication terminal over a network, the method comprising the steps of:
dynamically generating a first single-use key associated with the first communication terminal and a second single-use key associated with the second communication terminal during a request to establish a call from the first communication terminal to the second communication terminal over the network, the first single-use key and the second single-use key being generated as a function of time data related to at least one previous communication between the first communication terminal and the second communication terminal;

comparing the first single-use key and the second single-use key; and authorizing the establishment of the communication when the compared first single-use key and second single-use key are identical.

2. The method according to claim 1, wherein the time data contains a date and a time related to at least one previous communication between the first communication terminal and the second communication terminal.

3. The method according to claim 1, wherein the time data contains an indication of a time zone that corresponds to the first communication terminal.

4. The method according to claim 1, wherein the time data relates to a last communication between the first communication terminal and the second communication terminal.

5. The method according to claim 1, wherein the time data relates to a combination of previous communications between the first communication terminal and the second communication terminal.

6. The method according to claim 1, wherein the steps of dynamically generating the first single-use key and the second single-use key, comparing the generated first single-use key and second single-use key, and authorizing the establishment of the communication are executed by a server via which is established the communication between the first communication terminal and the second communication.

7. The method according to claim 1, wherein the first communication terminal dynamically generates the first single-use key and transmits the first single-use key to the second communication terminal, and wherein the second communication terminal generates the second single-use key, compares the generated first single-use key and second single-use key, and authorizes the establishment of the communication when the compared first single-use key and second single-use key are identical.

8. The method according to claim 1, wherein the network is an Internet Protocol (IP) network.

9. The method according to claim 1, wherein the first communication terminal or the second communication terminal is a voice-over-IP landline telephone.

10. A communication terminal configured to establish a communication between the communication terminal and another communication terminal over a network, the communication terminal being configured to dynamically generate a first single-use key associated with the communication terminal as a function of time data related to at least one previous communication between the communication terminal and said another communication terminal during a request to establish a call from the communication terminal to said another communication terminal;

transmit the generated first single-use key to said another communication terminal capable of dynamically generating a second single-use key associated with said another communication terminal as a function of the time data related to said at least one previous communication between the communication terminal and said another communication terminal;

compare the first single-use key and the second single-use key; and authorize the establishment of the communication when the compared first single-use key and second single-use key are identical.

11. A communication terminal configured to establish a communication between the communication terminal and another communication terminal over a network, the communication terminal being configured to receive a first single-use key associated with said another communication terminal dynamically generated by said another communication terminal as a function of time data related to at least one previous communication between the communication terminal and said another communication terminal during a request to establish a call from said another communication terminal to the communication terminals;

dynamically generate a second single-use key as a function of the time data related to the at least one previous communication between the communication terminal and said another communication terminal;

compare the first single-use key and the second single-use key; and authorize the establishment of the communication when the compared first single-use key and second single-use key are identical.

12. A server configured to establish a communication between a first communication terminal and a second communication terminal over a network, the server being configured to dynamically generate a first single-use key associated with the first communication terminal and a second single-use key associated with the second communication terminal during a request to establish a call from the first communication terminal to the second communication terminal over the network, the first single-use key and the second single-use key being generated as a function of time data related to at least one previous communication between the first communication terminal and the second communication terminal;

compare the first single-use key and the second single-use key; and authorize the establishment of the communication when the compared first single-use key and second single-use key are identical.

13. A non-transitory computer-readable medium having computer executable instructions, said computer-readable medium being implemented within a server configured to establish a communication between a first communication terminal and a second communication terminal over a network, comprising the steps of:

dynamically generating a first single-use key associated with the first communication terminal and a second single-use key associated with the second communication terminal during a request to establish a call from the first communication terminal to the second communication terminal over the network, the first single-use key and the second single-use key being generated as a function of time data related to at least one previous communication between the first communication terminal and the second communication terminal;

comparing the first single-use key and the second single-use key; and authorizing the establishment of the communication when the compared first single-use key and second single-use key are identical.

* * * * *